US008391149B2

(12) United States Patent
Casati et al.

(10) Patent No.: US 8,391,149 B2
(45) Date of Patent: Mar. 5, 2013

(54) HANDOVER METHOD AND APPARATUS IN A WIRELESS TELECOMMUNICATIONS NETWORK

(75) Inventors: Alessio Casati, Swindon (GB); Philippe Godin, Viroflay (FR); Sudeep Kumar Palat, Grange Park (GB)

(73) Assignee: Alcatel Lucent, Paris (FR)

(*) Notice: Subject to any disclaimer, the term of this patent is extended or adjusted under 35 U.S.C. 154(b) by 739 days.

(21) Appl. No.: 12/228,434

(22) Filed: Aug. 13, 2008

(65) Prior Publication Data

US 2009/0046660 A1 Feb. 19, 2009

(30) Foreign Application Priority Data

Aug. 14, 2007 (EP) .................................. 07291014
Dec. 27, 2007 (EP) .................................. 07291634

(51) Int. Cl.
*H04L 12/26* (2006.01)
(52) U.S. Cl. ...................................................... 370/235
(58) Field of Classification Search .................. 370/310, 370/328, 329, 331, 229–231, 235, 236, 241, 370/248, 252, 332, 351, 389, 394, 400, 431, 370/437; 455/403, 422.1, 436–439, 441, 455/440–452.2, 456.1, 456.5–456.6, 39, 455/500, 507, 509, 512–513, 517, 524, 525
See application file for complete search history.

(56) References Cited

U.S. PATENT DOCUMENTS

| 4,860,219 A | * | 8/1989 | Schulz et al. ................ 358/1.17 |
| 6,847,820 B1 | * | 1/2005 | Hageltorn et al. ............ 455/446 |
| 2002/0067707 A1 | * | 6/2002 | Morales et al. ............... 370/331 |
| 2005/0094586 A1 | | 5/2005 | Zhang et al. .................. 370/310 |
| 2007/0010250 A1 | * | 1/2007 | Bosch et al. .................. 455/436 |
| 2007/0036109 A1 | * | 2/2007 | Kwak et al. ................... 370/331 |
| 2007/0177547 A1 | * | 8/2007 | Horn et al. .................... 370/331 |
| 2008/0240439 A1 | * | 10/2008 | Mukherjee et al. ........... 380/272 |
| 2010/0227614 A1 | * | 9/2010 | Chun et al. .................... 455/436 |

FOREIGN PATENT DOCUMENTS

WO WO 97/02716 1/1997
WO PCT/EP2008/006179 12/2009

OTHER PUBLICATIONS

3GPP: "3GPP TS 36.423 V0.1.0 (Jun. 2007) 3$^{rd}$ Generation Partnership Project: Technical Specification Group Radio Access Network; Evolved Universal Terrestrial Radio Access Network (EUTRAN); X2 Application Protocol (X2AP); (Release 8)" Internet Citation, [Online], Jun. 2007, pp. 1-13.

(Continued)

*Primary Examiner* — Omar Ghowrwal
(74) *Attorney, Agent, or Firm* — Fay Sharpe LLP

(57) ABSTRACT

According to an aspect of the invention, a method for handover of a mobile terminal from a source node to a target node in a wireless telecommunications network includes the steps of making data forwarding of fresh data optional irrespective of the RLC mode, which may involve RLC-UM or RLC-AM bearers.

The method may include providing an explicit instruction to the mobile terminal for each bearer on whether a bearer is subject to data forwarding or not. This may then be used by the mobile terminal to handle the buffered packets and PDCP SNs.

15 Claims, 4 Drawing Sheets

OTHER PUBLICATIONS

"Universal Mobile Telecommunications System (UMTS); Evolved Universal Terrestrial Radio Access (E-UTRA) and Evolved Universal Terrestrial Radio Access (E-UTRAN); Overall description: Stage 2 (3GPP TS 36.300 version 8.1.0 Release 8); ETSI TS 136 300", ETSI, Sophia Antipolis Cedex, France, vol. 3-R2, No. V8.1.0, Jun. 2007, pp. 42-45, "10.1.2.11" and "10.1.2.1.2"; Figure 10.1.2.1.

Chinese Office Action, Application No. 200810161159.6, Apr. 16, 2012.

* cited by examiner

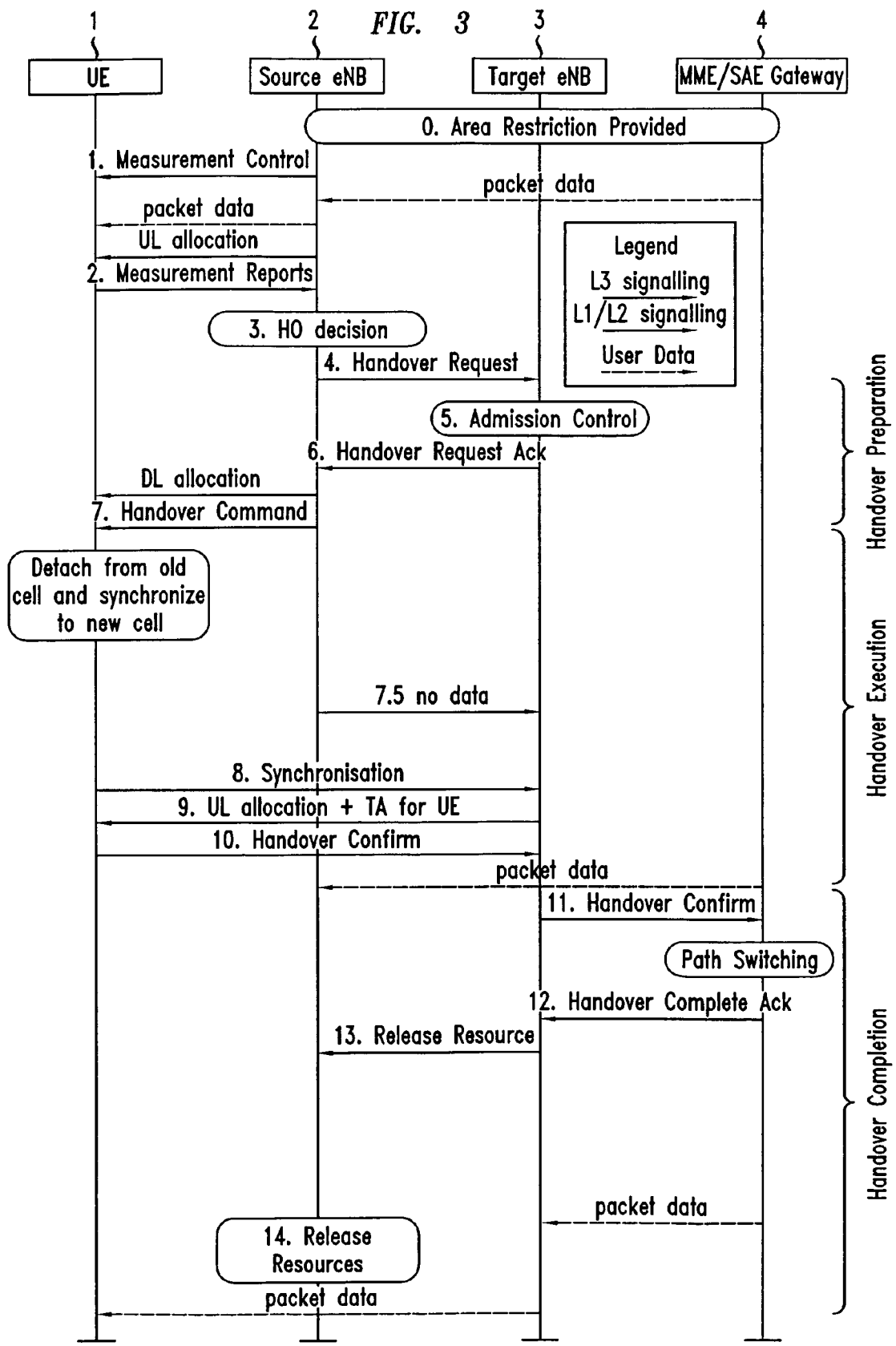

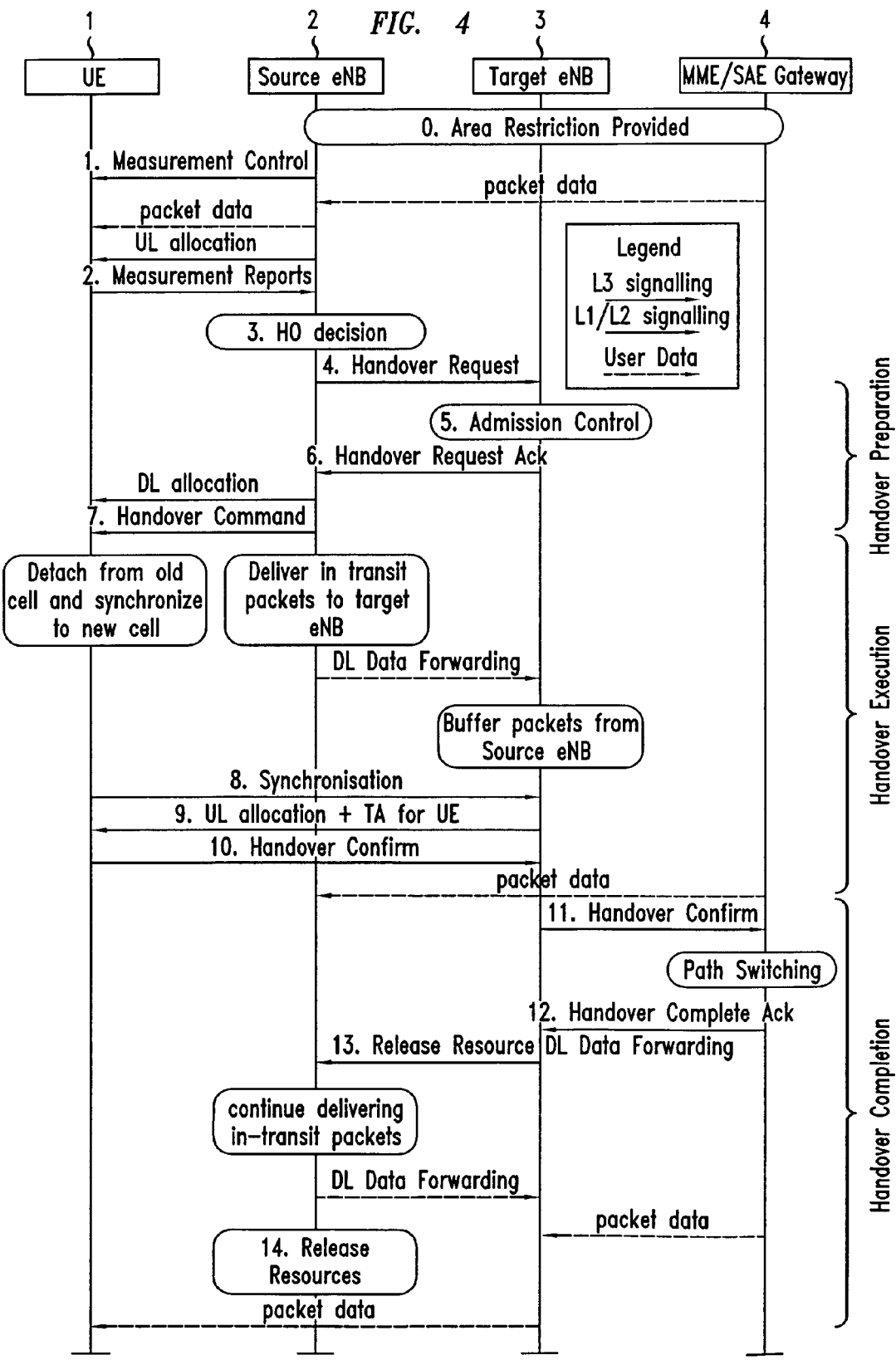

US 8,391,149 B2

HANDOVER METHOD AND APPARATUS IN A WIRELESS TELECOMMUNICATIONS NETWORK

FIELD OF THE INVENTION

The present invention relates to a method and apparatus for handover in a wireless telecommunications network, and more particularly, but not exclusively, to a method and apparatus implemented in accordance with the 3rd Generation Partnership Project (3GPP) evolved Universal Terrestrial Radio Access Network (E-UTRAN) and evolved Universal Terrestrial Radio Access (E-UTRA) specifications.

BACKGROUND OF THE INVENTION

Currently, 3GPP is considering development of E-UTRA and E-UTRAN as set out in the technical specification 3GPP TS 36.300 v 8.1.0 (2007-06), incorporated herein by way of reference, and related documents. 3GPP Long Term Evolution (LTE) aims to enhance the Universal Mobile Telecommunications System (UMTS) standard, for example, by improving efficiency and services.

In E-UTRAN, user equipment (UE) communicates with a network node, NodeB (eNB), with data being sent on radio bearers (RBs) over a radio link between them. The eNB interfaces with a Mobile Management Entity/System Architecture Evolution Gateway (MME/SAE GW) via an interface designated as S1. An E-UTRAN network includes a plurality of eNBs and MME/SAE GWs.

In LTE, all the Radio Access Network (RAN) functions are integrated in each node, eNB. Downlink user data, that is Internet Protocol (IP) packets, are transmitted from the SAE GW to the eNB. As the UE is handed over from a first, source, eNB to a second, target, eNB, the SAE GW is updated with the second eNB address and the SAE GW starts to send data to that target eNB.

However, to avoid data loss, any data that is already buffered in the source eNB must be forwarded to the target eNB. Also, data that has been sent to the source eNB during the handover (HO) procedure, before the SAE GW is updated with the new eNB address, is also forwarded by the source eNB to the target eNB.

To preserve the order of packets sent to the UE, the target eNB must strive to send data over the radio in the same order as sent by the SAE GW. That is, firstly data buffered by the eNB is sent to the target eNB, followed by data in transit from the SAE GW during the HO process, and only when these have all been sent should the target eNB send to the UE fresh data that it receives directly from the SAE GW.

The message flow for the HO process applied to a UE 1 is shown in FIG. 1 which illustrates a network including a source eNB 2, a target eNB 3 and an MME/SAE GW 4. When the source eNB 2 makes a handover decision based on measurement reports from the UE 1, it sends a Handover Request message to the target eNB 3. At the Admission Control step 5, the target eNB 3 configures the required resources and sends a Handover Request Acknowledge message to the source eNB 2. Following the handover command from the source eNB 2 to the UE 1, the UE 1 detaches from the old cell and synchronises to the new cell associated with the target eNB 3. Also, data packets buffered at the source eNB 2 and any in transit are forwarded to the target eNB 3 over an interface designated X2. Following the handover confirm message at step 10 from the UE 1 to the target eNB 3, a handover completion message is sent to the MME/SAE GW 4 by the target eNB 3. Data packets from the source eNB 2 continue to be delivered to the target eNB 3. The target eNB can then send fresh data arriving over S1 from MME/SAE GW once all the forwarded data from source eNB 2 has been received by it.

Forwarded data from the source eNB to the target eNB may take two forms for LTE: forwarding of data buffered at the source eNB and forwarding of freshly arriving packets at the source eNB over S1. Lossless HO requires that both these types of data are forwarded from the source to the target eNB. 3GPP RAN2 has discussed and agreed the data forwarding principles to provide lossless inter-eNB handover. However, the conditions when lossless HO should be applied have not been discussed so far.

It cannot be assumed that all data received at the source eNB before the HO Command is delivered to the UE is considered "buffered" data and has accordingly been allocated Packet Data Convergence Protocol (PDCP) sequence numbers (SNs). Incoming packets may be provided with a PDCP SN as soon as they are received by the eNB or, alternatively, a PDCP SN may be provided just before delivery to the UE in near real time. Any packets that have not been actually sent to the UE can be treated as fresh data over S1 as long the last used PDCP SN is used correctly.

It was also agreed by 3GPP RAN 2 that forwarding of buffered packets should be carried out based on radio link control (RLC) status reports. RLC status reports are provided where the RLC acknowledged mode (RLC-AM) is selected for a radio bearer. The acknowledged mode (AM) provides enhanced reliability as it allows retransmission of incorrect or lost data packets, and is suitable for non-real time services, for example.

In RLC unacknowledged mode (RLC-UM), no retransmission protocol is used and there are no RLC status reports, and thus data forwarding is not envisaged for RLC-UM. The unacknowledged mode may be used, for example, for certain radio resource control (RRC) signalling and voice over IP (VoIP). The choice as to which RLC mode to adopt is based on the residual bit error rate (BER) required for the bearer and the Hybrid Automatic Repeat Request (HARQ) operating point.

BRIEF SUMMARY

According to a first aspect of the invention, a method for handover of a mobile terminal from a source node to a target node in a wireless telecommunications network includes the step of: making a determination as to whether or not to forward data from the source node to the target node, and the determination for each radio bearer being made independently of which radio link control, RLC, mode it supports. Thus, in a method in accordance with the invention, data forwarding may be selected irrespective of whether RLC-UM or RLC-AM bearers are involved and may be chosen per radio bearer. This provides flexibility independent of RLC mode. The method is applicable to networks implemented in accordance with Long Term Evolution, LTE, standards, but may also be used in other types of network.

In a method in accordance with the invention, the choice of whether or not to implement data forwarding may be determined with reference to the Quality of Service (QoS) requirements for the bearer and on performance of the last mile, such as cost and/or speed, for example. Data forwarding could be chosen per radio bearer taking into account the QoS requirements of the bearer, but is not essential since the reasons for choosing to forward data may, for example, include instead, or additionally, the amount of S1 and X2 delay. For example, if the last mile topology for X2 is up to the S1 anchoring point, forwarding data will be costly for the operator and slow.

Operators may decide not to use data forwarding for these cases. Further, the mobility rate of the UE may also impact the decision about whether to forward data or not. It may not be worthwhile to implement data forwarding for a slow moving UE. Thus, even for RLC-AM, data forwarding may be avoided for situations such as these.

If the S1 link or MME S-GW link is slow, the path switch could be delayed significantly and it may thus be desirable to forward packets considered to be fresh data, that is, without associated SNs, received by the source node over S1, even where the mode is RLC-UM.

According to another method in accordance with the invention, when it is determined that data forwarding is not used, the Packet Data Convergence Protocol (PDCP) sequence numbers (SNs) are reset, irrespective of which RLC mode is used.

A method in accordance with the invention may include providing an instruction to the mobile terminal for each bearer as to whether a bearer is subject to data forwarding or not. This may then be used by the mobile terminal to handle the buffered packets and PDCP SNs. The instruction may be included, for example, as part of the Handover command or as a separate message.

Previously, for RLC-AM, the PDCP sequence number was continued in the target node after the HO. This was considered essential for re-sequencing and identifying packet duplicates over the radio. For this reason, the last used PDCP SN of the buffered packets and the last used PDCP SN were transferred to the target node by the source node. In a method in accordance with the invention, in contrast, when it is determined not to forward data to the target node, the PDCP sequence number is re-started with a known value and the last used PDCP SN is not transferred to the target node. Where the X2 interface between the source and target nodes is slow compared to the S1 interface, transferring the PDCP SN information to the target node could increase the interruption time, since the target node must wait for this SN before sending any fresh data received directly by it over S1. By re-starting the PDCP SN, this potential interruption can be avoided.

According to another method in accordance with the invention, for RLC-UM there is no need to transfer the PDCP SN to the target node and it is simply re-started.

According to a method in accordance with the invention, since the mobile terminal must know if the PDCP should be reset or continued, a mechanism for signalling this to the mobile terminal is included. Where the PDCP SN is arranged to restart when data forwarding is not implemented, the mobile terminal may be signalled that data forwarding is not being used, so as to alert it that PDCP should be reset, whatever RLC mode is being used. Also, indicating to a mobile terminal that a bearer is not subject to data forwarding allows the mobile terminal to deliver any buffered packets immediately to the upper layers. The mobile terminal can also re-initialise the PDCP SN to a known value.

According to a second aspect of the invention a method for handover of a mobile terminal from a source node to a target node in a wireless telecommunications network, includes the step of: forwarding data from the source node to the target node for a radio bearer in RLC-UM mode.

According to a third aspect of the invention method for handover of a mobile terminal from a source node to a target node in a wireless telecommunications network, includes the step of: not forwarding data from the source node to the target node for a radio bearer in RLC-AM mode.

According to a fourth aspect of the invention, a wireless telecommunications network is arranged to implement a method in accordance with any aspect of the invention.

According to a fifth aspect of the invention, a decision making device for a wireless telecommunications network comprises: an information store; and a decision processor arranged to receive information from the information store and use it to determine whether or not to forward data from a source node to a target node during handover, the determination for each radio bearer being made independently of which radio link control, RLC, mode it supports. The information store may hold fixed data, data that is updated at intervals or continuously revised data, or combinations of these for different types of data, and may include information such as QoS requirements, mobile terminal velocity and performance over one or more interfaces. Measurements may be provided by a mobile terminal which is undergoing handover from a source node to update the information. The decision making device may be included in a network node, for example, a decision making device may be included in each eNB in an LTE network, and the eNB comprising the source node during a handover procedure may be the one at which the determination is made. Other types of network node may comprise a decision making device in accordance with the fifth aspect of the invention.

BRIEF DESCRIPTION OF THE DRAWINGS

Some embodiments and methods in accordance with the invention are now described, by way of example only, and with reference to the accompanying drawings, in which:

FIG. 3 schematically illustrates a network and messaging during handover; and

FIG. 4 schematically illustrates a network and messaging during handover.

DETAILED DESCRIPTION

Figure 2:
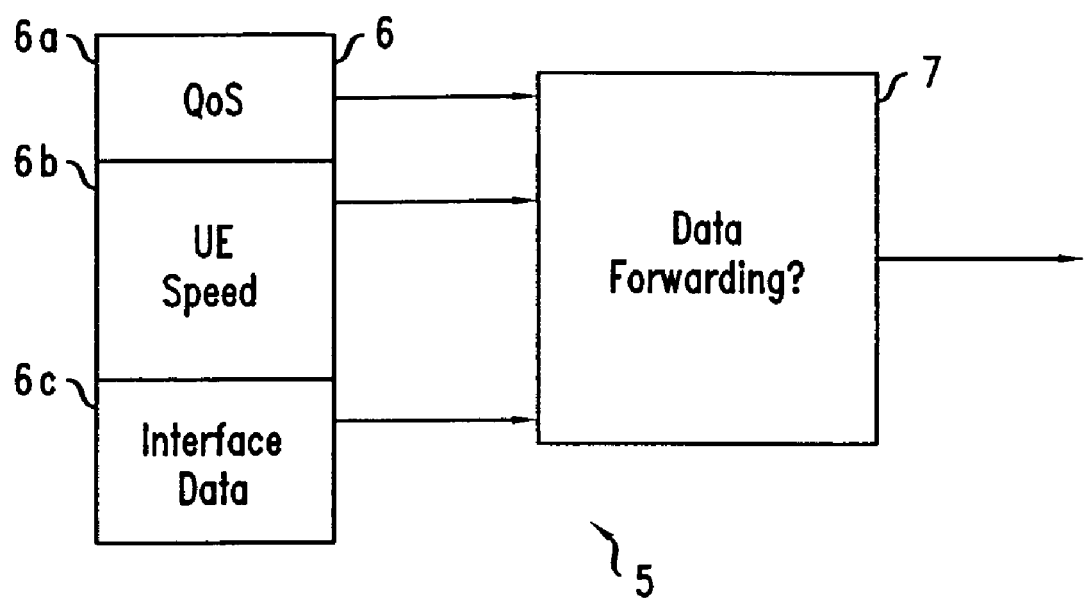
FIG. 2 schematically illustrates a decision making device in accordance with the invention.

With reference to FIG. 2, a decision making device 5 includes an information store 6 containing data about various network parameters and about a mobile terminal 1 which is currently in an established connection with a source eNB 2, shown in FIG. 3. A processor 7 accesses the information held in the store 6, which may include QoS data 6a, UE speed data at 6b, and interface data relating to S1 and X2 at 6c, and uses it to make a determination as to whether or not data forwarding should be implemented when the mobile terminal 1 is handed over from the source eNB 2 to a target eNB 3. The processor 7 does not take into account the RLC mode of a radio bearer when making its determination. Suitable choice of the type of data held in the store 6 and how it is applied to the determination permits an operator to selectively choose data forwarding per bearer depending on deployment scenario and costs. For example, the operator can choose not to forward data over a costly last mile saving on transport cost. It allows the operator to choose data forwarding if the S1 link is slow for the path switch and avoid packet loss and poor service.

Figure 1:
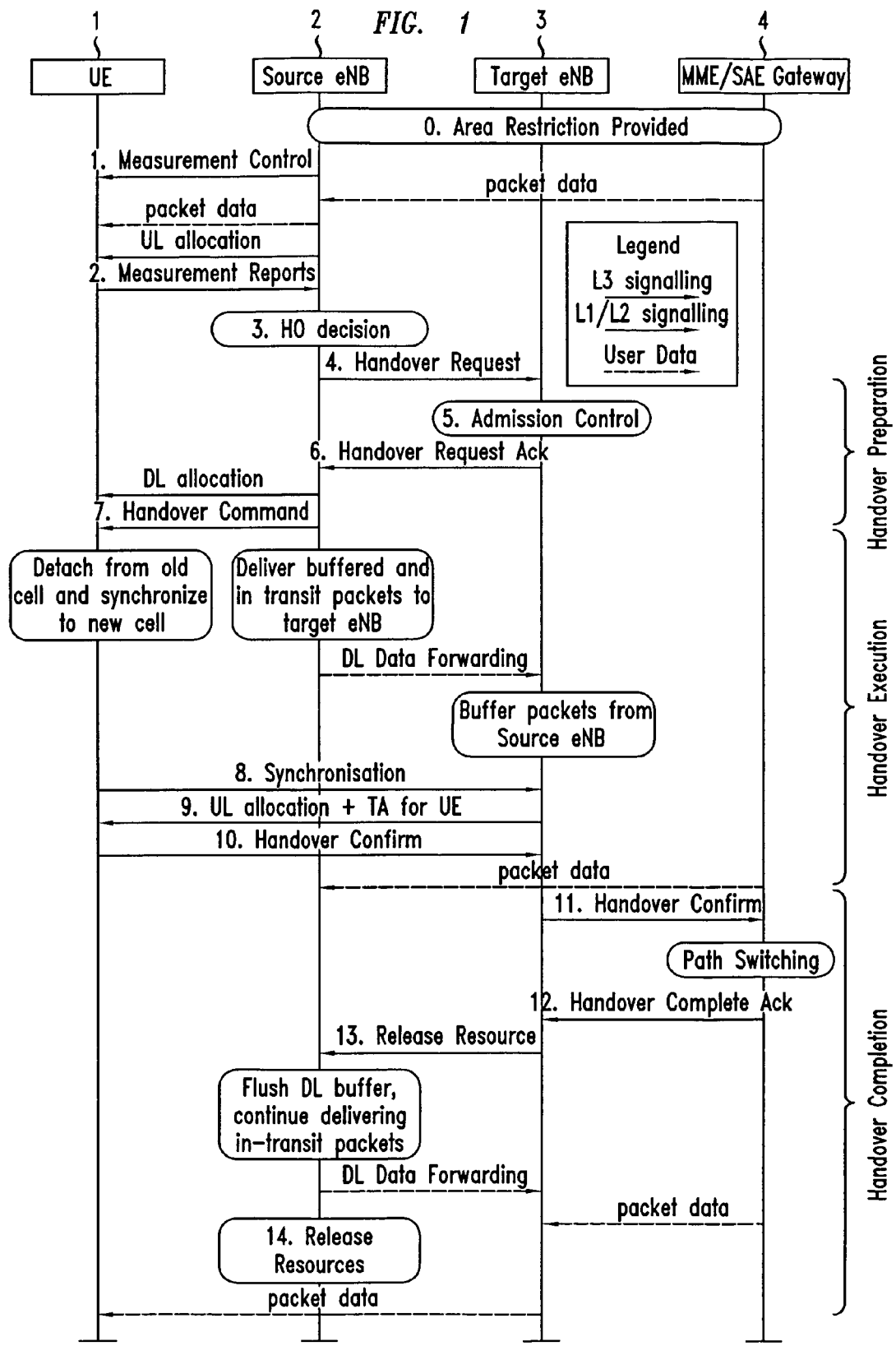
FIG. 1 schematically illustrates a network and messaging during handover.

With reference to FIG. 3, for a bearer having RLC-AM, a decision is taken by device 5 not to implement data forwarding and this decision is transmitted to the source eNB 2. When the handover command at step 7 is sent to the UE 1, it includes information that data forwarding is not being implemented, so that the UE knows to reset the PDCP SN to a known value. The source eNb 2 also sends notification to the target eNB 3 that there is no data to be forwarded, shown as step 7.5 on FIG. 2. On receipt of the "No Data" message, the target eNB 3 resets the PDCP SN to a known value. Although in this described case, no data forwarding is implemented, for other cases, data forwarding may be implemented for this bearer. In that event, the handover command 7 includes information that data forwarding is being used and the process continues as shown in the messaging set out in FIG. 1.

With reference to FIG. 4, for a bearer having RLC-UM, a decision is taken by device 5 to implement data forwarding and this decision is transmitted to the source eNB 2. When the handover command at step 7 is sent to the UE 1, it includes information that data forwarding is being implemented. In this case, the data forwarded is fresh data. An alert may be sent to target node 3 that data forwarding is to be carried out, but this may not be necessary as the target eNB 3 will be aware of this when it starts to receive the data packets. Although in this described case, data forwarding is implemented, for other cases, data forwarding may be implemented for this bearer.

The indication of data forwarding or not to the UE reduces HO interruption time because the LTE can deliver any buffered packets to the upper layers immediately. It is useful for the UE to know if data forwarding is supported by the network for each bearer. If data forwarding is not used for a particular bearer, there are two possibilities for PDCP handling—there is no specific reason to maintain sequence numbers across the HO procedure. Further, the UE can immediately deliver any buffered packets to the higher layers without waiting for any missing packets for re-ordering. It can also immediately set the PDCP SN to the known value.

In one example, for a VoIP data bearer, an operator might choose to use RLC-UM because the HARQ residual error is considered good enough and the additional delay introduced by RLC-AM would create additional end-to-end delay. If this bearer is not subject to data forwarding, any packets in transit towards the source eNB will be lost. With this option, the operator has the flexibility to choose to do data forwarding for this bearer. If the S1 path switch delay is long, it can result in more packets arriving at the source eNB and lost as they are not forwarded. With the proposed solution, specific deployments of VoIP flows can be subject to forwarding.

The other motivation is to not forward TCP flows using RLC-AM. If the last mile is costly or slow, then an operator might choose not to use data forwarding for this deployment. The solution allows the operator to make the right choice per bearer, per deployment scenario etc. on whether data forwarding is to be used or not.

The present invention may be embodied in other specific forms and implemented in other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for handover of a mobile terminal from a source node to a target node in a wireless telecommunications network, the method comprising:
   using at least one processor, making a forwarding determination for particular radio bearers as to whether or not to forward user data from the source node to the target node,
   the forwarding determination for a given radio bearer of the particular radio bearers over a link between the mobile terminal and the source node being made independently of which radio link control (RLC) mode the given radio bearer supports,
   the forwarding determination for the given radio bearer being dependent on velocity of the mobile terminal and at least one of:
      Quality of Service requirements for the given radio bearer, and
      performance over at least one interface between the source node and the target node or between one of the source and target nodes and a Mobile Management Entity/System Architecture Evolution Gateway (MME/SAE GW) of the wireless telecommunications network, and
   re-starting a Packet Data Convergence Protocol (PDCP) sequence number (SN) with a known value and not transferring a last used PDCP SN to the target node when it is determined not to forward the user data from the source node to the target node.

2. The method of claim 1, further comprising:
   resetting Packet Data Convergence Protocol (PDCP) sequence numbers (SNs) when it is determined not to forward user data from the source node to the target node.

3. The method of claim 1, further comprising:
   providing an instruction to the mobile terminal for each given radio bearer on whether the given radio bearer is subject to user data forwarding or not.

4. The method of claim 3, wherein the instruction is included as part of a Handover command message.

5. The method of claim 1, wherein the method is implemented in accordance with Long Term Evolution (LTE) standards.

6. The method of claim 1, comprising independently making a forwarding determination for each given radio bearer of a plurality of radio bearers dependent on at least one of:
   the Quality of Service requirements for the given radio bearer,
   performance over one or more interfaces, and
   velocity of the mobile terminal.

7. The method of claim 1, comprising selectively forwarding user data associated with each given radio bearer of a plurality of radio bearers according to the forwarding determination for the given radio bearer.

8. The method of claim 1, wherein the at least one interface is one of an S1 and an X2 interface.

9. A wireless telecommunications network, comprising:
   a plurality of nodes; and
   a decision making device implemented using at least one processor, the decision making device being arranged, during handover of a mobile terminal from a source node to a target node, to make a forwarding determination for particular radio bearers as to whether or not to forward a user data from the source node to the target node,
   the forwarding determination for a given radio bearer of the particular radio bearers over a link between the mobile terminal and the source node being made independently of which radio link control (RLC) mode the given radio bearer supports, and
   the forwarding determination for the given radio bearer being dependent on velocity of the mobile terminal and at least one of:
      Quality of Service requirements of the given radio bearer, and performance over at least one interface between the source node and the target node or between one of the source and target nodes and a Mobile Management Entity/System Architecture Evolution Gateway (MME/SAE GW) of the wireless telecommunications network, and re-starting a Packet Data Convergence Protocol (PDCP) sequence number (SN) with a known value and not transferring a last used PDCP SN to the target node when it is determined not to forward the user data from the source node to the target node.

10. The wireless telecommunications network of claim 9, wherein the decision-making device is arranged, during handover of the mobile terminal from the source node to the target mode, to independently make a forwarding determination for each given radio bearer of a plurality of radio bearers dependent on at least one of:

the Quality of Service requirements for the given radio bearer, performance over one or more interfaces, and velocity of the mobile terminal.

11. The wireless telecommunications network of claim 9, wherein the decision-making device is arranged to selectively forward user data associated with each given radio bearer of a plurality of radio bearers according to the forwarding determination for the given radio bearer.

12. The wireless communications network of claim 9, wherein the at least one interface is one of an S1 interface and an X2 interface.

13. A decision making device for a wireless telecommunications network, comprising:

an information store; and a decision processor arranged to receive information from the information store and use it to make a forwarding determination for particular radio bearers whether or not to forward user data from a source node to a target node during handover, the forwarding determination for a given radio bearer of the particular radio bearers over a link between a mobile terminal and the source node being made independently of which radio link control (RLC) mode the given radio bearer supports, and the forwarding determination for the given radio bearer being dependent on velocity of the mobile terminal and at least one of:

Quality of Service requirements of the given radio bearer, and performance over at least one interface between the source node and the target node or between one of the source and target nodes and a Mobile Management Entity/System Architecture Evolution Gateway (MME/SAE GW) of the wireless telecommunications network, and the decision processor being arranged to re-start a Packet Data Convergence Protocol (PDCP) sequence number (SN) with a known value and not transferring a last used PDCP SN to the target node when it is determined not to forward the user data from the source node to the target node.

14. The decision-making device of claim 13, wherein the decision processor is arranged to independently make a forwarding determination for each given radio bearer of a plurality of radio bearers dependent on at least one of:

the Quality of Service requirements for the given radio bearer, performance over one or more interfaces, and velocity of the mobile terminal.

15. The decision-making device of claim 13, wherein the decision processor is arranged to selectively forward user data associated with each given radio bearer of a plurality of radio bearers according to the forwarding determination for the given radio bearer.

* * * * *